US011880935B2

(12) United States Patent
Wu et al.

(10) Patent No.: US 11,880,935 B2
(45) Date of Patent: Jan. 23, 2024

(54) MULTI-VIEW NEURAL HUMAN RENDERING

(71) Applicant: SHANGHAITECH UNIVERSITY, Shanghai (CN)

(72) Inventors: Minye Wu, Shanghai (CN); Jingyi Yu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 17/951,405

(22) Filed: Sep. 23, 2022

(65) Prior Publication Data
US 2023/0027234 A1 Jan. 26, 2023

Related U.S. Application Data

(63) Continuation of application No. PCT/CN2020/082120, filed on Mar. 30, 2020.

(51) Int. Cl.
*G06T 17/00* (2006.01)
*G06V 10/82* (2022.01)
(Continued)

(52) U.S. Cl.
CPC ............ *G06T 17/00* (2013.01); *G06F 18/213* (2023.01); *G06F 18/214* (2023.01); *G06T 7/593* (2017.01); *G06T 15/04* (2013.01); *G06T 15/205* (2013.01); *G06T 17/20* (2013.01); *G06V 10/82* (2022.01); *G06V 20/653* (2022.01); *H04N 13/207* (2018.05); *G06T 2200/08* (2013.01);
(Continued)

(58) Field of Classification Search
None
See application file for complete search history.

(56) References Cited

U.S. PATENT DOCUMENTS 6,084,979 A * 7/2000 Kanade ................ H04N 13/189
348/E13.052
2007/0274584 A1* 11/2007 Leow ..................... G03B 42/02
382/132
(Continued)

FOREIGN PATENT DOCUMENTS

CN 109269405 A 1/2019

OTHER PUBLICATIONS

Qi et al., "Pointnet++: Deep hierarchical feature learning on point sets in a metric space," Advances in neural information processing systems, 30 (2017) (Year: 2017).*
(Continued)

*Primary Examiner* — Anh-Tuan V Nguyen
(74) *Attorney, Agent, or Firm* — Bayramoglu Law Offices LLC (57) ABSTRACT

An image-based method of modeling and rendering a three-dimensional model of an object is provided. The method comprises: obtaining a three-dimensional point cloud at each frame of a synchronized, multi-view video of an object, wherein the video comprises a plurality of frames; extracting a feature descriptor for each point in the point cloud for the plurality of frames without storing the feature descriptor for each frame; producing a two-dimensional feature map for a target camera; and using an anti-aliased convolutional neural network to decode the feature map into an image and a foreground mask.

21 Claims, 7 Drawing Sheets

(51) Int. Cl.
  *G06F 18/214*   (2023.01)
  *G06F 18/213*   (2023.01)
  *G06T 15/04*    (2011.01)
  *G06T 15/20*    (2011.01)
  *G06T 17/20*    (2006.01)
  *G06V 20/64*    (2022.01)
  *G06T 7/593*    (2017.01)
  *H04N 13/207*   (2018.01)

(52) U.S. Cl.
  CPC .............. *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/30196* (2013.01); *G06T 2210/56* (2013.01)

(56) References Cited

U.S. PATENT DOCUMENTS

| | | | | |
|---|---|---|---|---|
| 2014/0019917 | A1* | 1/2014 | Piemonte | G06F 3/04815 715/848 |
| 2015/0071524 | A1* | 3/2015 | Lee | G06T 7/593 382/154 |
| 2017/0270593 | A1* | 9/2017 | Sherman | G06V 40/171 |
| 2018/0218510 | A1* | 8/2018 | Taguchi | G06V 20/64 |
| 2019/0087952 | A1* | 3/2019 | Milbert | G06V 30/424 |
| 2019/0122373 | A1 | 4/2019 | Natroshvili et al. | |
| 2019/0180454 | A1 | 6/2019 | Choudhury et al. | |
| 2019/0354797 | A1* | 11/2019 | Nesta | G06F 18/256 |
| 2019/0371080 | A1* | 12/2019 | Sminchisescu | G06T 17/20 |
| 2020/0051252 | A1* | 2/2020 | Brown | G06F 18/214 |
| 2020/0213736 | A1* | 7/2020 | Kim | H04R 5/027 |
| 2020/0251229 | A1* | 8/2020 | Rai | G16Y 20/20 |
| 2020/0349729 | A1* | 11/2020 | Wu | G06T 7/571 |
| 2021/0019928 | A1* | 1/2021 | Borer | G06F 17/15 |
| 2021/0150275 | A1* | 5/2021 | Schulter | G06V 20/58 |
| 2021/0233213 | A1* | 7/2021 | Mejjati | G06V 10/82 |
| 2021/0375044 | A1* | 12/2021 | George | G06T 15/04 |
| 2022/0014723 | A1* | 1/2022 | Pandey | G06V 10/462 |
| 2022/0245911 | A1* | 8/2022 | Hu | G06N 3/08 |

OTHER PUBLICATIONS

Martin-Brualla et al., "Lookingood: Enhancing performance capture with real-time neural re-rendering," arXiv preprint arXiv: 1811.05029 (2018) (Year: 2018).*

Zhang, "Making convolutional networks shift-invariant again," International conference on machine learning, PMLR, 2019 (Year: 2019).*

PCT International Search Report and the Written Opinion dated Dec. 30, 2020, issued in corresponding International Application No. PCT/CN2020/082120 (8 pages).

Moustafa Meshry et al., "Neural Rendering in the Wild", Proceedings of the IEEE/CVF Conference on Computer Vision and Pattern Recognition (CVPR), Dec. 31, 2019, pp. 6878-6887.

Kara-Ali Aliev et al., "Neural Point-Based Graphics", arXiv:1906.08240v2 [cs.CV], Jul. 16, 2019.

* cited by examiner

MULTI-VIEW NEURAL HUMAN RENDERING

CROSS-REFERENCE TO RELATED APPLICATION

This application is a continuation application of International Patent Application No. PCT/CN2020/082120, filed on Mar. 30, 2020. The above-referenced application is incorporated herein by reference in its entirety.

TECHNICAL FILED

This invention relates generally to the field of image processing, and more specifically, to multi-view neural human rendering.

BACKGROUND

There have been tremendous demand for generating high quality 3D models of human in motion. Applications are numerous, ranging from producing ultra-realistic avatars in virtual and augmented reality, to enabling holographic and immersive telecommunications supported by the latest data transmission networks. By far, most existing approaches have relied on conventional modeling and rendering pipelines: the 3D geometry of a performer is first captured using either active (e.g., depth cameras such as Microsoft Kinect) or passive (e.g., a multi-camera dome) systems and stored in the form of a 3D point cloud; the point cloud is then triangulated, texture mapped, compressed, streamed, and rendered at the viewing device. To achieve high fidelity reconstruction, dome-based systems require a large number of densely sampled cameras to handle occlusions, textureless regions, and detailed geometry such as hands. Depth-camera based solutions such as Holoportation are still restricted by the limited resolution. Often, a lot of manual work is needed to produce commercial quality results.

Image-based modeling and rendering (IBMR) attempts to interpolate new views or rays from the sampled ones, guided by low quality reconstruction. Earlier techniques such as lumigraph use coarse geometry proxy such as planes or visual hulls to select and then blend the sampled images or rays. The quality of such techniques relies heavily on the accuracy of the proxy. Image-based visual hull bypasses 3D proxy generation using image-space ray ordering. In practice, existing IBMR methods are vulnerable to occlusions and cannot preserve fine details. It is also possible to improve proxy geometry by fitting an adjustable 3D model. The seminal work of Skinned Multi-Person Linear (SMPL) model pre-scans 1786 human shapes and then learns a human model from data including the rest pose template, blend weights, pose-dependent blend shapes, identity-dependent blend shapes, and a regressor from vertices to joint locations. It then estimates the shape parameters of the recovered point cloud. SMPL, however, assumes the "bare skin" model and cannot directly handle clothing or strong shape variations under complex poses. Shape deformation can partially mitigate the problem, but it is sensitive to reconstruction noise and holes.

It is to be noted that the above information disclosed in this Background section is only for facilitating the understanding of the background of this invention, and therefore may contain information that is already known to a person of ordinary skill in the art.

SUMMARY

In view of the limitations of existing technologies described above, the present invention provides multi-view neural human rendering that address the aforementioned limitations. Additional features and advantages of this inventive concept will become apparent from the following detailed description or may be in part learned by practicing this inventive concept.

One aspect of the present invention is directed to an image-based method of modeling and rendering the three-dimensional model of an object. The method may comprise obtaining the three-dimensional point cloud at each frame of a synchronized, multi-view video of an object; extracting the feature descriptor for each point in the point clouds for the plurality of frames without storing the feature descriptor for each frame; producing the two-dimensional feature map for a target camera; and using an anti-aliased convolutional neural network to decode the feature map into an image and a foreground mask. The video may comprise a plurality of frames.

In some embodiments, the point cloud may be not triangulated to form a mesh.

In some embodiments, the method may further comprise obtaining the three-dimensional point cloud at each frame of the synchronized, multi-view video of the object using a three dimension scanning sensor comprising a depth camera.

In some embodiments, the method may further comprise capturing the synchronized, multi-view video of the object by a plurality of cameras from a plurality of view directions, and reconstructing the three-dimensional point cloud at each frame of the video.

In some embodiments, the method may further comprise taking into consideration the view directions in extracting the feature descriptor.

In some embodiments, each point in the point cloud may comprise color. The method may further comprise imposing the recovered color of the points in the feature descriptor.

In some embodiments, the method may further comprise extracting the feature descriptor using PointNet++.

In some embodiments, the method may further comprise removing the classifier branch in PointNet++.

In some embodiments, the feature descriptor may comprise a feature vector comprising at least 20 dimensions.

In some embodiments, the feature vector may comprise 24 dimensions.

In some embodiments, the method may further comprise producing the two-dimensional feature map for the target camera by mapping the feature descriptor to the target view where back-propagation of the gradient on the two-dimensional feature map can be directly conducted on the three-dimensional point cloud, and calculating the depth map for the target camera.

In some embodiments, the method may further comprise using U-Net to decode the feature map into the image and the foreground mask.

In some embodiments, the method may further comprise inputting the feature map and the depth map to U-Net to produce the image and the foreground mask.

In some embodiments, the method may further comprise replacing the downsampling operation in U-Net with Max-BlurPool and ConvBlurPool.

In some embodiments, the method may further comprise replacing the convolutional layer in U-Net with a gated convolution layer.

In some embodiments, the method may further comprise maintaining translation invariance for the feature map.

In some embodiments, the method may further comprise training the convolutional neural network using training data captured by the plurality of sample cameras without performing labeling of the training data.

In some embodiments, the method may further comprise training the convolutional neural network using the ground truth foreground mask.

In some embodiments, the method may further comprise performing two-dimensional image transformation to the training data.

In some embodiments, the method may further comprise generating a plurality of masks from a plurality of viewpoints, and using the masks as silhouettes to conduct visual hull reconstruction of a mesh.

In some embodiments, the method may further comprise partitioning a space of interest into a plurality of discrete voxels; classifying the voxels into two categories; and computing a signed distance field to recover the mesh.

In some embodiments, the object may be a performer.

In some embodiments, the method may further comprise training the convolutional neural network using data from a plurality of performers, and training the convolutional neural network using data from the performer.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of the description, illustrate embodiments consistent with this invention and, together with the description, serve to explain the disclosed principles. It is apparent that these drawings present only some embodiments of this invention and those of ordinary skill in the art may obtain drawings of other embodiments from them without exerting any creative effort.

DETAILED DESCRIPTION OF THE EMBODIMENTS

Exemplary embodiments will now be described more fully with reference to the accompanying drawings. However, these exemplary embodiments can be implemented in many forms and should not be construed as being limited to those set forth herein. Rather, these embodiments are presented to provide a full and thorough understanding of this invention and to fully convey the concepts of the exemplary embodiments to others skilled in the art.

In addition, the described features, structures, and characteristics may be combined in any suitable manner in one or more embodiments. In the following detailed description, many specific details are set forth to provide a more thorough understanding of this invention. However, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

1. Introduction

Embodiments of the present invention resort to neural rendering (NR) to improve IBMR. Existing NR explores deep networks to "fix" the visual artifacts. For example, one method exploits semantic information embedded in the captured imagery data to improve rendering. However, existing methods require using a large volume of training data, i.e., densely sampled input views. It is also possible to apply NR at the geometry stage of the classical graphics rendering pipeline, e.g., by directly refining the input 3D and texture data. For example, another method proposes a Neural Texture technique to handle noisy 3D geometry. However, it cannot handle severe defects such as holes caused by occlusions. In addition, nearly all existing NR techniques aim to handle static rather than dynamic models. Brute-force approaches that separately train at individual time instances are neither efficient nor practical.

The embodiments of the present invention provide an end-to-end Neural Human Renderer (NHR) that produces high quality rendering from low fidelity 3D point cloud of dynamic human models.

Figure 1:
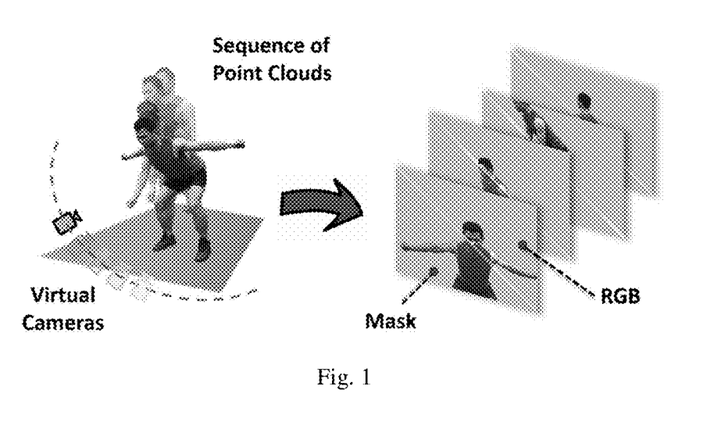
FIG. 1 is an exemplary diagram showing the neural human renderer (NHR) in accordance with one embodiment of the present invention producing photorealistic free-view-video (FVV) from multi-view dynamic human captures.

FIG. 1 is an exemplary diagram showing the neural human renderer (NHR) in accordance with one embodiment of the present invention producing photorealistic free-view-video (FVV) from multi-view dynamic human captures.

Figure 2:
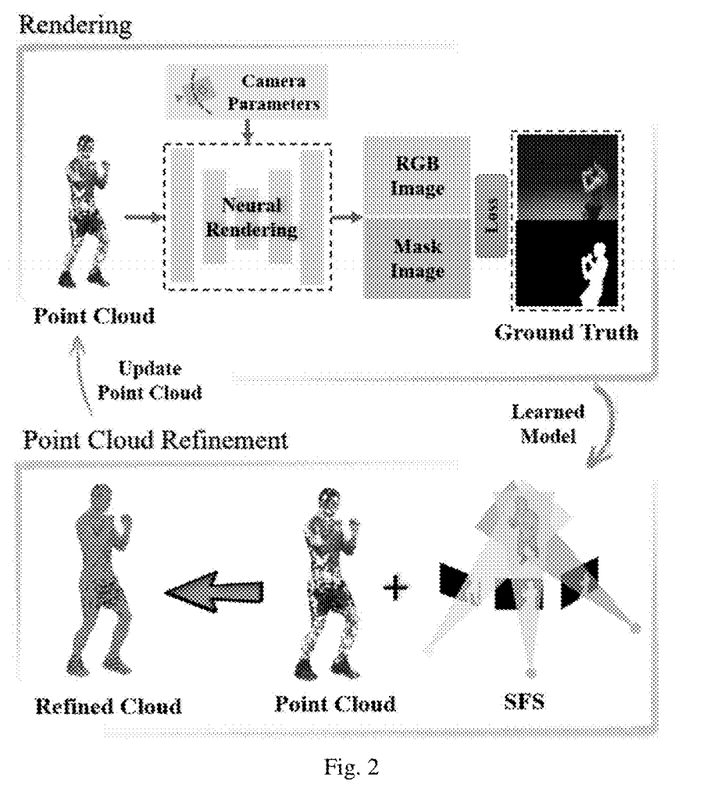
FIG. 2 is an exemplary diagram showing the NHR pipeline in accordance with one embodiment of the present invention employing neural rendering on spatiotemporal, low-quality 3D point clouds for multi-view rendering, and that the rendering results can be used to further improve multi-view reconstruction by patching holes and textures.

FIG. 2 is an exemplary diagram showing the NHR pipeline in accordance with one embodiment of the present invention employing neural rendering on spatiotemporal, low-quality 3D point clouds for multi-view rendering, and that the rendering results can be used to further improve multiview reconstruction by patching holes and textures. The NHR trains on multi-view videos and is composed of three modules: feature extraction (FE), projection and rasterization (PR), and rendering (RE). The FE module adopts PointNet++ to analyze and extract features based on structure and semantics. The extracted features are used to establish correspondences between the reconstructed models over time even under strong topology or reconstruction inconsistencies. More importantly, it eliminates the requirement for dense view samples by exploiting temporal coherence. The PR module maps 3D features onto the target camera to form a 2D feature map where back-propagation of the gradient on the 2D map can be directly conducted on the 3D point cloud. Finally, the RE module renders the final image from the feature map at a new viewpoint. Specifically, RE aims to handle incomplete and noisy geometry by employing an anti-aliased CNN with a gated convolution layer to enhance translation invariance.

As shown in FIG. 2, the newly synthesized views from the NHR is used to further improve 3D reconstruction. Specifically, the pipeline is modified to output an additional foreground human mask. Rendering a dense set of new views enables high fidelity visual hull reconstruction. In particular, the constructed visual hull from the NHR supplements the MVS point cloud and efficiently tackles texture-less or dark regions such as black clothing. Comprehensive experiments show the NHR significantly outperforms the state-of-the-art IBR techniques and can reliably handle hands, hair, nose, foot, etc. that are traditionally difficult to reconstruct even under dense capture setups.

2. Related Work

Rapid advances in 3D scanning and reconstruction techniques over the past decade have laid the foundation for 3D modeling and most recently, rendering, of real humans.

Reconstruction. Passive human reconstruction schemes follow traditional reconstruction pipelines by using a large number of cameras facing towards the character. Structure-from-motion can be used to first estimate the intrinsic and extrinsic of the cameras. Occasionally the intrinsic can be pre-computed to further improve robustness and accuracy. Multi-view stereo (MVS) can then be applied to extract a point cloud of the human subject. It is worth noting that the density and quality of the point cloud depend heavily on the availability of textures: rich textures often lead to much denser reconstruction whereas textureless or dark regions can lead to sparse and unreliable reconstruction. There are a few recent approaches that use a dome formed by stereo pairs so that each pair can obtain more reliable estimation via stereo matching to partially tackle the textureless problem. The point cloud is then triangulated to form a mesh, such as via Poisson Surface completion, to enable efficient texture mapping. In practice, human body imposes additional challenges besides texturelessness: human body exhibits complex topology and hence occlusions. Consequently, the reconstruction contains holes where brute-force surface completion produces adhesive artifacts, such as arms stitched to the torso, or fingers "glued" as blobs. To this day, even commercial solutions (e.g., 8i, DGene) fail to produce high quality 3D reconstruction even with hundreds of cameras.

Parametric modeling. Alternative modeling schemes attempt to fit a parametric model to the acquired image or point cloud. A number of such models exploit priors in shape, pose and appearance to estimate the optimal human geometry. A strong assumption of such models is the "bare-skin" model: since human clothing has strong variations that cannot be easily reduced to simple parametric models, all of these models require the subject to wear tight clothing. For example, the notable work of SMPL has such a requirement. The results are reasonable, even using a video or a single image. However, the clothing restriction significantly limits the applicability of the parametric models, as it is often desirable that the subject wears fancy clothing.

Rendering. One can potentially bypass the 3D reconstruction process if the goal is to render the subject as real as possible at new viewpoints, e.g., via image-based modeling and rendering (IBMR). Methods in these categories exploit coarse geometry obtained either through multi-view stereo or by even simpler methods such as shape-from-silhouette for interpolating new views from the sampled views. Geometry proxy can be as simple as a plane or as complex as parametric human shapes, and view interpolation can be efficiently implemented via view-dependent texture mapping or by an unstructured lumigraph shader. In earlier days where the resolution of the display was relative low, the rendering artifacts can be "hidden" through blurs or ghosting. More recent rendering techniques based optical flow can partially enhance the rendering quality but still produce noticeable visual artifacts near occlusion boundaries.

The method in accordance with the embodiments of the present invention exploits neural rendering that has shown promising results on image synthesis. Different from IBMR, NR attempts to learn from sampled images to mitigate visual artifacts. Methods based on GAN learn the distribution of images and produce impressive results on several image generation tasks such as denoting, deblurring, super-resolution, etc. NR is used to bridge the gap between low quality 3D reconstruction and high quality image synthesis for dynamic 3D humans. For static scenes, NR can also be used in conjunction with classical IBR to achieve view-dependent rendering, image-based relighting, mesh denoising, and correspondence matching at both the voxel level and the point level.

The recent Generative CNN models aim to synthesize body appearance and/or body articulation. These techniques can fix artifacts in captured 3D performances and enhance low quality 3D face reconstruction, but cannot tackle dynamic models. On the other hands, the technique in accordance with embodiments of the present invention tackles dynamic models by exploiting temporal shape variations to compensate for sparsity in viewpoint sampling, as rich body shape and appearance variations over time are sufficient to compensate the lack of sufficient viewpoints. In addition, the rendered results can be used to further improve reconstruction.

3. Approach Overview

The notations are explained below first. The multi-view stereo (MVS) input is assumed, although active 3D sensing can also fit naturally into the pipeline by bypassing the reconstruction process. The input to the NHR pipeline consists of a synchronized, multi-view video sequence $\mathcal{I} = \{I_t^c\}_{c=1,t=1}^{n_c,n_t}$ towards a performer, where c is the camera index, $n_c$ is the total number of cameras, t is the frame index, $n_t$ is the total number of frames. The intrinsic and extrinsic at each camera c are assumed as $\{K^c\}_{c=1}^{n_c}$ and $\{T^c\}_{c=1}^{n_c}$. The human foreground masks $\mathcal{M}$ Mt are extracted at all frames to facilitate training. Under the MVS setting, a point cloud is constructed at each frame $\mathcal{P} = \{P_t\}$. Each point in the point cloud is assumed to have color, computed through reprojection on the input views' image as $\mathcal{Y} = \{Y_t\}$.

The first task of the NHR is to synthesize high quality new views through the rendering process (Section 4). In addition to RGB color rendering, a foreground mask is produced to facilitates model refinement (Section 5). Specifically, the initial point cloud sequence $\mathcal{P}$ is not only noisy but also contains many holes due to occlusions. The model refinement process can effectively fill in these holes in the synthesized new views that can be used to further improve rendering. FIG. 2 shows the iterative render-model procedure.

4. NHR Rendering

4.1 The Rendering Process

The NHR rendering process consists of three modules: Feature Extraction (FE), projection and rasterization (PR), and Rendering (RE).

Figure 3:
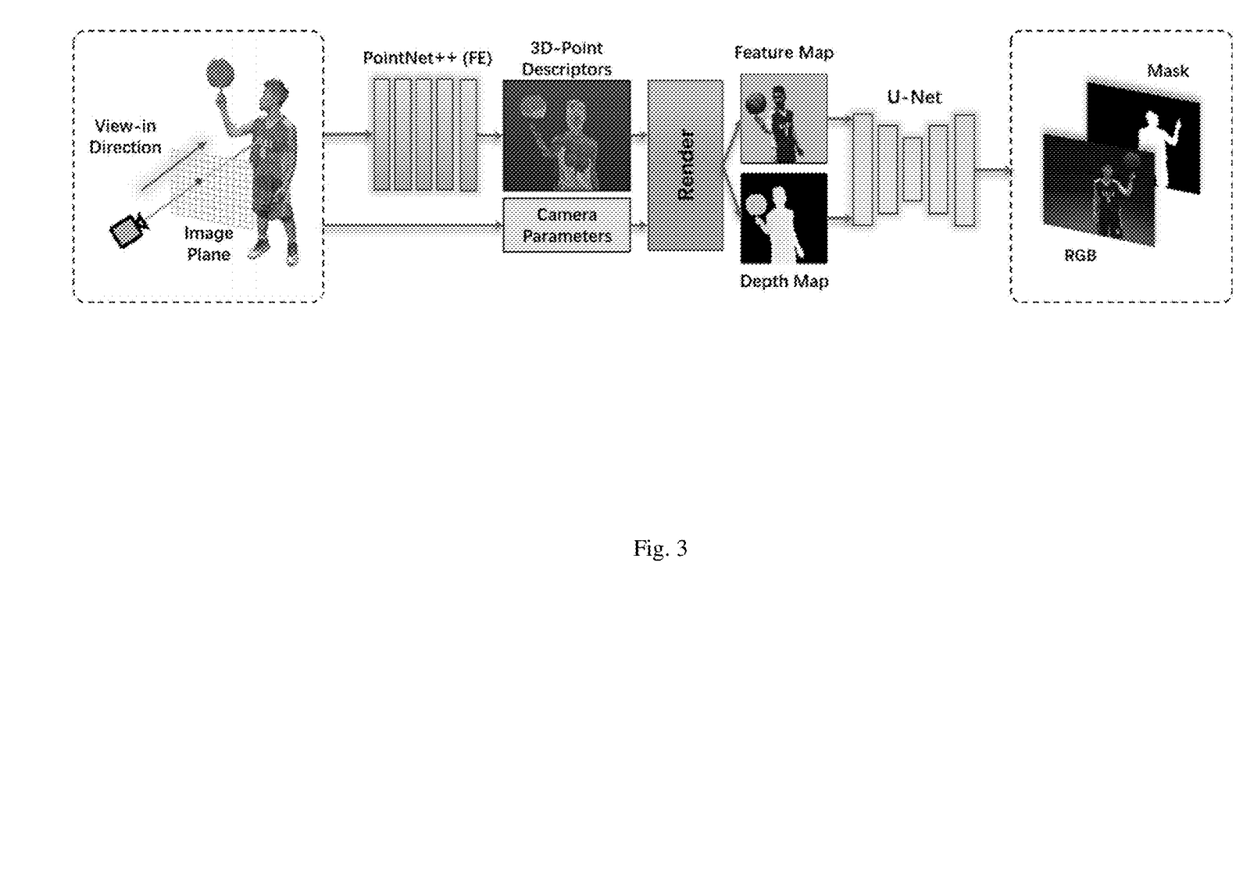
FIG. 3 is an exemplary diagram showing the NHR in accordance with one embodiment of the present invention consisting of three modules: Feature Extraction (FE) based on PointNet++ to process spatio-temporal point cloud sequences, Projection and Rasterization (PR) for feature projection, and U-Net based renderer for feature decoding.

FIG. 3 is an exemplary diagram showing the NHR in accordance with one embodiment of the present invention consisting of three modules: Feature Extraction (FE) based on PointNet++ to process spatio-temporal point cloud sequences, Projection and Rasterization (PR) for feature projection, and U-Net based renderer for feature decoding.

Feature Extraction. Existing neural rendering on point cloud requires learning a feature descriptor at each 3D point beyond its original RGB color. Different from a static 3D model, it is observed that under the dynamic human capture setting, the recovered point cloud at each time instance is different in point number and density, as the reconstruction is determined by the MVS technique. Such inconsistency introduces additional challenges: learning a feature descriptor at each point at each time instance is computationally expensive and requires a significant amount of storage. In addition, the number of view cameras is relatively small and therefore there are limited samples for learning the descriptor. The embodiments of the present invention instead set out to use all images at all time instances. In particular, semantic features in human shape and their coherence over time are explored. These features are learned from end-to-end supervision.

Specifically, Pointnet++can effectively serve as a feature extractor. Under the MVS setting, the appearance at different viewpoints can exhibit variations due to lighting directions, cloth materials, skin reflectance, etc. Therefore, view direction is considered in the FE process to mitigate the view dependency effects. At the same time, the recovered color of the 3D points is imposed as prior. Equation 1 shows the FE process:

$$D_t = \psi_{fe}(\varphi_{norm}(P_t), \{Y_t, V\}) \quad (1)$$

where $\psi_{fe}$ corresponds to Pointnet++.

In embodiments of the present invention, the classifier branch in the original network is removed, and only the segmentation branch is kept as the FE branch. The point cloud and its features at each moment are taken as input to obtain a feature descriptor $D_t$. $V = \{v^i\}$ represents the (normalized) view direction towards a point as $$v^i = \frac{P_t^i - o}{\|P_t^i - o\|_2},$$

where o is the center of projection (CoP) of the target view camera, $\{\bullet\}$ represents concatenation that concatenates the color and the normalized view direction of the point as the initial point attributes (or features) feeding into $\psi_{fe}$. Point coordinates are normalized by using $\varphi_{norm}(\bullet)$.

Projection and Rasterization. Once the feature descriptor D of the point cloud is obtained, new views are synthesized. Given a target camera with intrinsic and extrinsic $\hat{K}$ and $\hat{T}$, the point cloud is projected onto the camera and splat points into pixel coordinates on image plane linearly. This step rasterizes points into pixel squares. The Z-buffer is used to maintain correct depth ordering and hence occlusions. This produces a projected 2D feature map S: $S_{x,y} = d_t^i$, where $d_t^i$ is feature descriptor of the i's point $P_t^i$ in $P_t$, preserved after z-buffer depth ordering onto pixel (x, y). Notice that the projected points only cover a small number of pixels in the target images, and for the rest of the pixels a learnable default feature vector $\theta_d$ is assigned. The complete PR process $\psi_{pr}$ for producing the 2D feature map S can be described as:

$$S, E = \psi_{pr}(P_t, D_t, \hat{K}, \hat{T}, \theta_d) \quad (2)$$

where E is the depth map in current view.

Rendering. The feature map S produced above provides an encoding of the target new view. In the final rendering stage (RE), a convolutional neural networks (CNN) is used to decode S into its corresponding RGB image and a foreground mask.

The recent U-Net architecture composed of multi-layer encoder-decoder structures with skip-connection has shown great success in image denoising deblurring and style transfer applications. In embodiments of the present invention, U-Net is used to decode S. Notice that the point cloud from MVS is sparse and the projected feature maps contain holes and even exhibits see-throughs where the foreground points are missing. These artifacts are treated as semantic noise. When using NR, the goal is to remove these incorrect pixels, and a gated convolution layer is adopted in place of the convolutional layer in U-Net. Specifically, the goal is to have the network identifies the location of these semantic noises through training and then exploit the attention mask mechanism to correct the feature maps at the convolution layer.

The depth map E generated from PR contains rich geometric information of the scene. In particular, abrupt changes in depth values is a strong indicator of semantic noise, especially for low depth values. Therefore, both S and standard normalized depth map $\hat{E}$ are used as input to the RE network to reduce semantic noises:

$$I^*, M^* = \psi_{render}(S, \hat{E}) \quad (3)$$

where $\psi_{render}$ represents the revised U-Net.

The final layer of $\psi_{render}$ outputs an image with four channels, the first three produces an RGB image I* and last produces the foreground human mask M* under Sigmoid.

Please note that the NHR aims to render the human subject from any view direction, i.e., the human subject can appear at any location within an image. This implies that the neural render should maintain translation invariance for the feature map S. In embodiments of the present invention, MaxBlurPool and ConvBlurPool are used to replace the downsampling operations in the original U-Net (including the pooling layer and the convolutional layer with stride), to mitigate incoherence caused by translation of the target camera. To briefly reiterate, prior art explores the anti-aliasing capability of Gaussian blurs on the feature maps in downsampling. In embodiments of the present invention, translation invariance is significantly improved.

4.2 Network Training

To acquire training data, a multi-camera dome system composed of up to 80 synchronized industrial high resolution cameras is used. These cameras are called sample cameras as in traditional image-based rendering. The dome uses a green screen to facilitate easy foreground segmentation. All cameras face inwards towards the performer although most cameras can only capture a part rather than the complete image of the performer, as discussed in Section 6. The ground truth foreground mask is obtained via chrome key based segmentation, followed by manual fixing. All cameras are pre-calibrated by using checkerboards for intrinsic and a patterned mannequin for extrinsic via structure-from-motion.

For training, one of the sample cameras is set as the target camera. This allows the use of the ground truth $I_t^c$ and $M_t^c$ to conduct supervised training. As described in Section 4, the end-to-end network updates the parameters by back-propagating the gradients of the loss function from 2D image to 3D point cloud. Since the goal is to render the target view as photo-realistic as possible, the perceptual loss and L1 loss are adopted as the loss functions as:

$$\mathcal{L}(\theta_{pn},\theta_{render},\theta_d) = \Sigma_{i=1}^{n_b}[\lambda \cdot (\|I_i^* - I_i\|_1 + \|M_i^* - M_i\|_1) + (1-\lambda) \cdot (\|\psi_{vgg}(I_i^*) - \psi_{vgg}(I_i)\|_2 + \|\psi_{vgg}(M_i^*) - \psi_{vgg}(M_i)\|_2)] \quad (4)$$

where $n_b$ is the batch size, $I_i^*$ and $M_i^*$ are the ith rendered output image and mask in the mini-batch, and $\psi_{vgg}(\cdot)$ extracts feature maps from the 2th and 4th layer of the VGG-19 network where the VGG-19 network is pre-trained on the ImageNet dataset.

Since the dome system consists of rather limited sample cameras (in one embodiment, at most 80 cameras), to train the network for better adaptation at arbitrary viewpoints, the training data is further augmented by 2D image transformations. Specifically, three types of transforms, namely random translation, random scaling and random rotation, are adopted, all of which can be easily achieved by modifying the camera's intrinsic/extrinsic parameters and re-rendering the 3D point cloud.

Conceptually, two training methods, namely individual training and shared training, can be adopted based on the type of input data. The former trains on each individual performer. Such an approach is suitable when only a small number of performers have been captured, or the network needs to be fine-tuned for a specific performer. The latter trains on a large number of performers, and the training process shares the same network weight of $\psi_{render}$ but produces different weights in FE. This allows the FE module to learn the unique geometric and appearance characteristics of individual performers while maintaining a unified feature embedding space. The shared rendering module further decodes the feature descriptors onto target images.

In embodiments of the present invention, the network is bootstrapped using shared training and then fine-tuned for each performer using individual training. For a new performer, $\psi_{render}$ is first fixed, and the FE module is trained from scratch using shared training. After 5 epochs of shared training, individual training is performed. This strategy significantly accelerates the training process.

5. Geometry Refinement

Occlusions are the most detrimental causes of reconstruction artifacts in traditional MVS, especially with a sparse set of sampling views. Clearly, if the region is not visible to any cameras, even dense MVS setups produce large patches of holes. Human body can exhibit diverse occlusion patterns (e.g., arms occluding torso, inner thigh occluded by the outer thigh, etc), so there is a high possibility the recovered geometry has holes. NHR can virtually patch these holes and produce satisfactory results at every time instance. However, when rendering a video sequence, the results produced flickering artifacts at the synthesized regions that originally correspond to holes, even though every individual frame produced reasonable results. Similar artifacts have been observed in existing NR techniques. The problem can be mitigated by reducing the holes via geometry refinement.

A possible solution is to directly use a parametric model to fit the recovered 3D point cloud. The fitted model can then be used to patch the holes while using the originally recovered ones for the rest. A significant limitation of this approach is that most existing parametric models such as the Skinned Multi-Person Linear Model assume the "bare-skin" model, i.e., the human is covered by tight clothing. For models with real clothes, the fitting process can lead to large errors. Further, using the "bare-skin" model to patch holes that correspond to clothing can lead to strong visual artifacts such as discontinuity.

Since the NHR also produces an auxiliary human mask at each new view, the visual hull approach is adopted. Compared with RGB images that contain rich details and noise, the masks generated by the NHR networks are much cleaner. To refine geometry, a dense set of new views are rendered, the resulting masks are used as silhouettes, and visual hull reconstruction based on space-carving or shape-from-silhouettes (SfS) is conducted. The approximated visual hull can then be used to patch the holes.

Figure 4A:
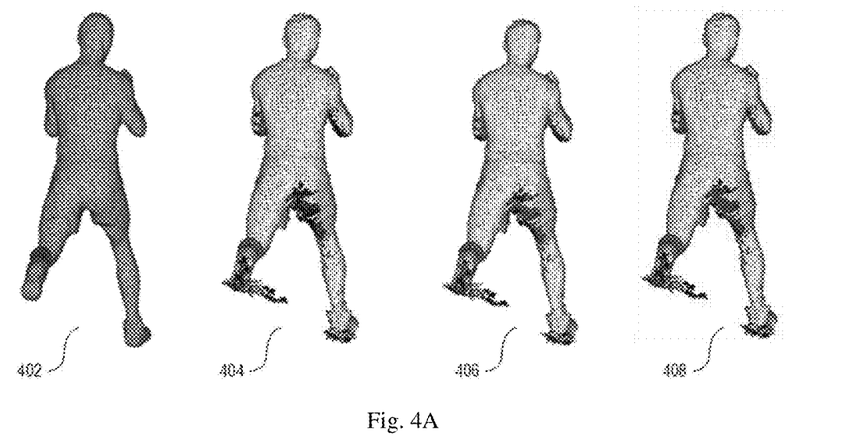
FIG. 4A is an exemplary diagram showing geometry refinement using the NHR in accordance with one embodiment of the present invention.
Figure 4B:
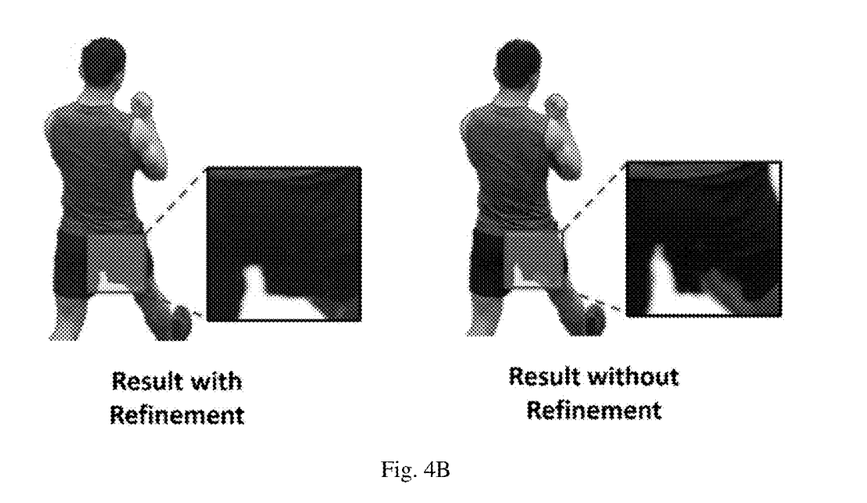
FIG. 4B shows closeup views of the NHR results with and without the geometry refinement as illustrated in FIG. 4A.

FIG. 4A is an exemplary diagram showing geometry refinement using the NHR in accordance with one embodiment of the present invention, where 402 shows the visual hull results (using Shape-from-Silhouette) of densely rendered views obtained by using the NHR, 404 shows the raw 3D reconstruction using structure-from-motion (SfM). 406 illustrates high coherence between the visual hull results of 402 and SfM geometry of 404, and 408 illustrates hole-patching to 404 by using 402. FIG. 4B shows closeup views of the NHR results with and without geometry refinement.

Mask and Shape Generation. To briefly reiterate, the MVS point cloud is used to train the rendering module to output a matte analogous to RGB images. Masks are rendered at a uniformly sampled set of new viewpoints towards the performer, each with known camera intrinsic and extrinsic. Specifically, the masks are rendered at a resolution of 800. Next, voxel-based SfS is conducted to reconstruct human mesh, which first partitions the space of interest into discrete voxels, and then classifies voxels into two categories, within and outside of the performer. Finally, SfS computes a signed distance field where the Marching Cube algorithm is used to recover the final mesh. In an embodiment of the present invention, another 80 novel views are generated so that a total of about 160 views are used to construct the visual hull. The mask produced by the NHR is actually a matte rather than a binary mask, and a uniform threshold is set to produce the corresponding binary mask. In one embodiment, the threshold is set as 0.4.

Point Sampling and Colorization. The SfS results $\hat{P}_t$ only contains geometry but not color. For each point $\hat{p}_t^i$ in $\hat{P}_t$, its color can be computed by using its nearest point in the MVS point cloud $P_t$. Hence, $\hat{Y}_t$ corresponding to $\hat{P}_t$ can be obtained.

Hole Patching. Although the SfS results can be directly used as the refined geometry, it is well-known that volumetric reconstruction is restricted by its resolution and the number of input views. In addition, the shapes recovered from silhouettes generally appear polygonal. Therefore, only the holes $U_t$ in $P_t$ from $\hat{P}_t$, i.e., $U_t \in \hat{P}_t$ are patched.

Figure 5A:
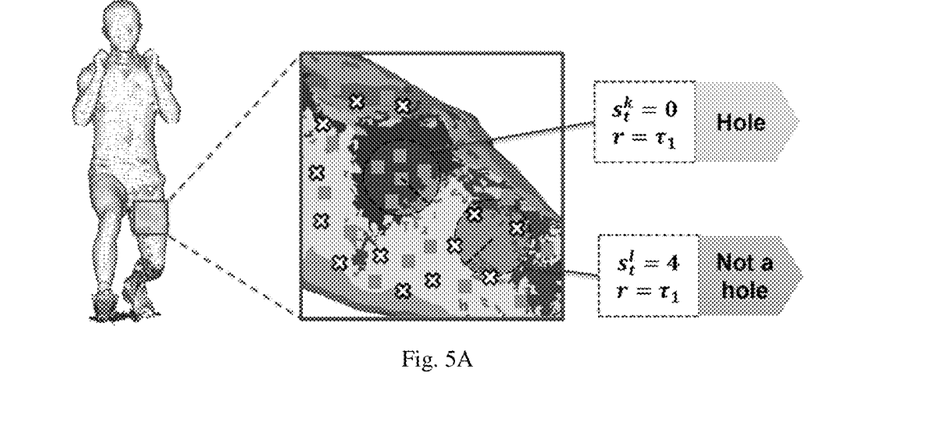
FIG. 5A is an exemplary diagram showing the statistical hole-patching techniques using the visual hull results to patch holes in terms of their distance distribution in accordance with one embodiment of the present invention.

FIG. 5A is an exemplary diagram showing the statistical hole patching techniques using the visual hull results to patch holes in terms of their distance distribution in accordance with one embodiment of the present invention.

Specifically, it is assumed that $\emptyset(\cdot,\cdot)$ represents the Euclidean distance between two 3D points. The hole patching scheme is based on the observation that for each point $u_t^i \in U_t$, $\emptyset(u_t^i, p_t^i)$ to its nearest point $p_t^i$ in $P_t$ is generally bigger than the points in $\hat{P}_t - U_t$. Hence, a statistical approach is adopted to find $U_t$, and $P_t$ should be farther than most of points, where $U_t$ denotes the subset of the point cloud $\hat{P}_t$ corresponding to holes in $P_t$. Therefore, the approximate $U_t$ can be obtained to make up for the break by statistically analyzing the distance between the point in $\hat{P}_t$ and the nearest point of $P_t$.

Let $b_t^i = \min\{\emptyset(\hat{p}_t^i, p_t^j)\}$, a threshold $\tau_1$ is set as:

$$\tau_1 = \lambda_t \cdot \max(b_t^i) + (1-\lambda_t) \cdot \text{median}(b_t^i) \quad (5)$$

where $\lambda_t$ is the weighting factor, and is set to 0.2 in one embodiment.

Next, the number of points in $\hat{P}_t$ whose distance to $p_t^j$ being below $\tau_1$ is counted as $s_t^i$, where $s_t^i = \#\{b_t^i | b_t^i < \tau_1\}$. Conceptually, $s_t^i$ is inversely proportional to the probability of the point belonging to $U_t$.

Figure 5B:
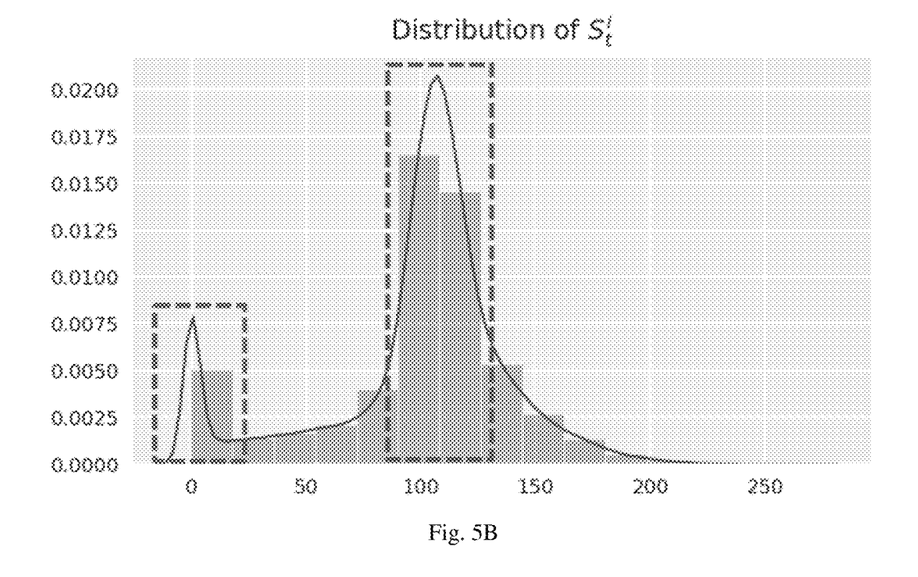
FIG. 5B is an exemplary diagram showing distance distribution of the points in the point cloud in accordance with one embodiment of the present invention.

Finally, the histogram of $s_t^i$ for all the points in set $\hat{P}_t$ is computed using 15 bins, evenly separated by the maximal distance value as shown in FIG. 5B. It is observed that in all cases the first bin contains significantly more points than the second and therefore can directly help to identify the closest points. Thus, the maximal distance value in the first bin is used as a threshold $\tau_2$ for selecting $U_t$ as:

$$U_t = \{\hat{p}_t^i | s_t^j < \tau_2, \hat{p}_t^i \in \hat{P}_t\} \quad (6)$$

As shown in FIG. 4B, refined geometry using SfS based hole-patching technique greatly reduces flickering when changing viewpoints. It is worth noting that the final geometry may still exhibit artifacts as its quality depends on the reliability of $\tau_1$ and $\tau_2$.

6. Experimental Results

All experiments are conducted on 3D dynamic human data collected by a multi-camera dome system with up to 80 cameras. All cameras are synchronized and capture at a resolution of 2048×1536 at 25 frames per second. In embodiments of the present invention, 5 sets of datasets are used where the performers are in different clothing and perform different actions. All sequences have a length between 8 to 24 seconds. Specifically, sport1, sport2, and sport3 respectively correspond to dumbbell lifting with relatively tight clothing, dancing with complex and highly deformable clothing, and basketball moves involving interactions between a player and a ball. As aforementioned, green screen matting followed by manual fixing is used to extract the ground truth masks for all views. For 3D reconstruction, one of the best commercial SfM software Metashape is used to compute the initial 3D point clouds for all frames.

In the network training and forward prediction steps, the target rendering resolution is set to be 800×600. The FE module extracts features vectors of 24 dimensions. By default, shared training for 4 epochs is used, followed by another 4 epochs of personalized training on each performer for fine-tuning. Adam is used for optimized training with a learning rate of 7e-5, along with warm-up periods. All trainings are conducted on a single 2080Ti with batch size 2 due to limitation on GPU memory. Shared training takes around 24 hours, while personalized training around 5 hours. The trained network can perform at 300 ms per frame.

Comparisons. The NHR is compared with a number of conventional and NR approaches.

Ground Truth (GT). The captured image data is resized to a resolution of 800×600, which is same as the output resolution of the network.

Point Cloud Rendering (PCR). The recovered color point clouds are directly projected onto the target camera, and the PR module is used to render the projected pixels to form the final RGB image sequences.

Textured Mesh (TM). Metashape is used to triangulate the point clouds and construct the texture maps for all frames. The results are rendered onto the image via standard rasterization.

PCR+U-net (PCR-U). The RGB point cloud is projected into the target view and feed into U-Net directly to refine the rendering results.

NHR with Geometry Refinement (NHR w GR). Geometry is first refined as described in Section 5, and then the refined point cloud is used to re-train the network with 3 epochs.

To verify the effectiveness of this method, the rendering results are compared with results from various algorithms to GT. For fairness, only the rendering of the foreground is compared. Since the NHR already predicts a mask at each target view, the result can be used to segment the NHR rendered foreground. For other techniques such as PCR and IBR, the foreground can be directly separated from the background using the mesh.

Figure 6:
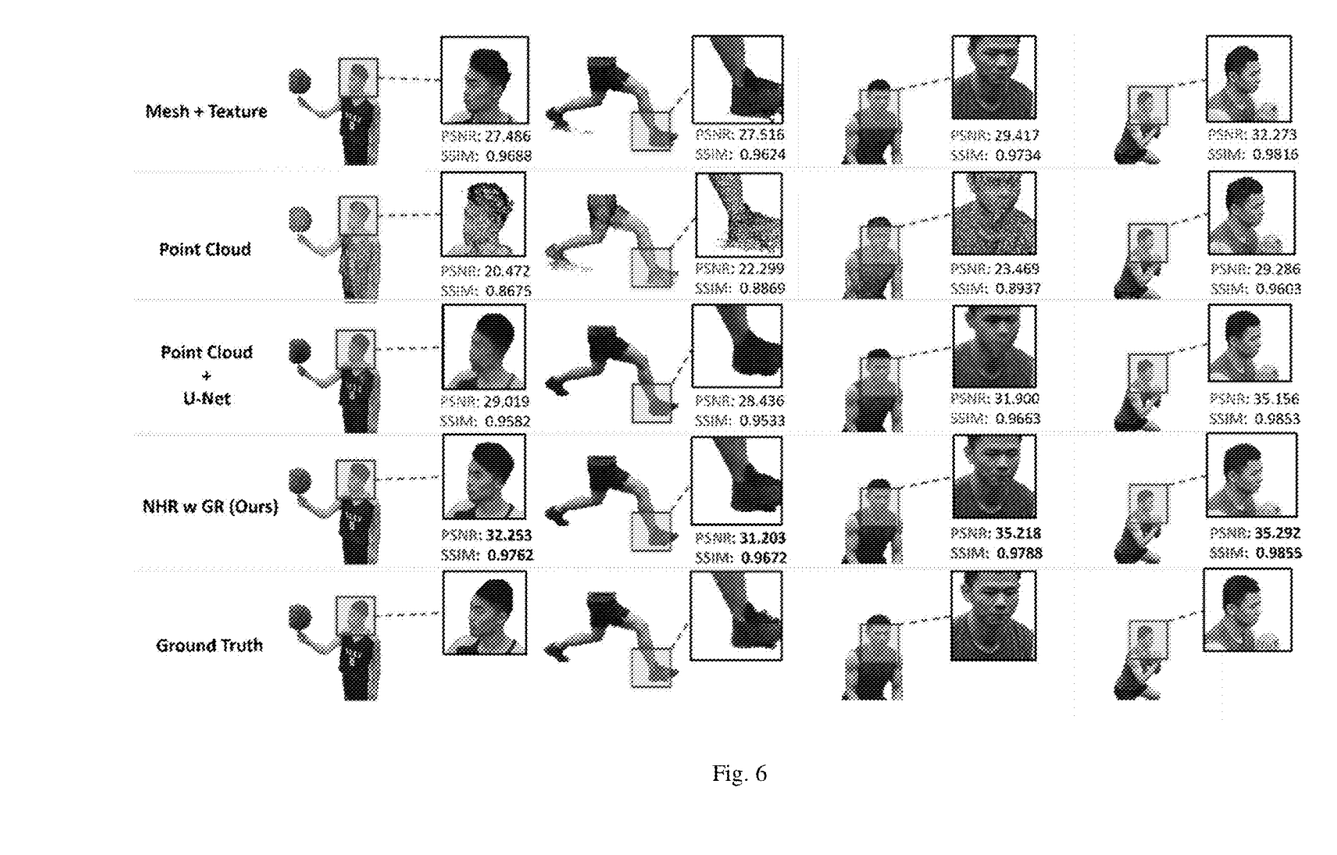
FIG. 6 is an exemplary diagram showing the comparisons on rendering quality using different approaches, wherein the NHR in accordance with one embodiment of the present invention manages to handle challenging cases such as hair, hands, foot, ball where 3D reconstruction methods fail.

FIG. 6 is an exemplary diagram showing the comparisons on rendering quality using different approaches. The use of U-Net in PCR-U can partially reduce noise and patch holes in the final rendering but its result exhibits excessive blurs at these regions. In contrast, the NHR exhibits much less blur. This is because the NHR network is specifically tailored to extract spatial features consistent across the temporal sequences, while most existing U-Net solutions are designed for static meshes. In other words, the NHR technique can infer missing geometric information at a specific frame from other frames in the dynamic sequence. The advantages of this approach is particularly obvious on heavily corrupted 3D geometry such as missing noses, fingers, holes on the body, etc., commonly observed in TM as shown in FIG. 6. In fact, even when the GT mask contains errors such as zigzagged or broken edges, the NHR network manages to fix the mask and produces better quality masks. As shown in the quantitative comparisons in FIG. 6, the NHR uniformly outperforms the other methods in PSNR and SSIM.

Figure 7:
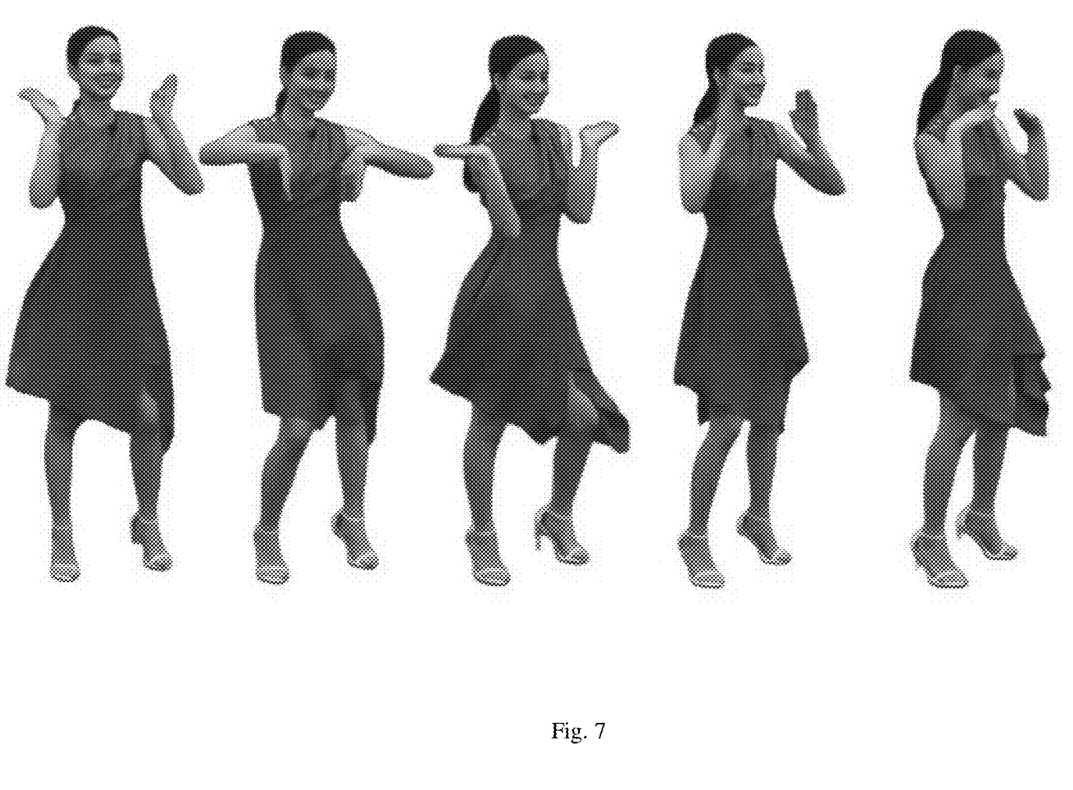
FIG. 7 is an exemplary diagram showing the Free View Video results on a challenging dance scene using the NHR in accordance with one embodiment of the present invention.

FIG. 7 is an exemplary diagram showing the Free View Video results on a challenging dance scene using the NHR in accordance with one embodiment of the present invention. The red blouses imposes significant challenges in 3D reconstruction. As shown in FIG. 7, the NHR can produce high quality FVV rendering from poor reconstructions.

The use of geometry refinement (GR) procedure further improves the model and rendering quality by filling in holes caused by occlusions as shown in FIG. 4B. This is particularly important to avoid flickering in NR-based rendering: with holes filled, the renderer can correctly handle depth ordering, thus avoiding undesirable see-through artifacts. In existing NRs, see-through is prevented in the image space and therefore when the viewpoint changes, the "patched" part can exhibit strong variance, causing flickering. By filling in the holes, such flickering is significantly reduced. On the sport1 dataset, the rendering quality is improved using GR: PSNR is raised to 31.7 from 29.2, and SSIM to 0.974 to 0.964.

Other Applications. View synthesis on dynamic humans can lead to a range of new rendering techniques. For example, the bullet-time effect, first presented in feature film "The Matrix", has broad applications in feature films and TV commercials to create an amazing stopping-time illusion. However, currently available dome system is not enough to meet the need of movie quality production, and the 3D reconstruction as shown in the embodiments of the present invention falls short of producing high quality rendering. Since the NHR manages to reduce or even eliminate strong visual artifacts, it can be used to produce bullet-time effects. It is particularly worth noting that existing NR techniques present strong flickering artifacts, which is detrimental to the bullet-time effect. The NHR-guided geometry refinement procedure greatly reduces flickering. In addition to regular bullet-time, i.e., fixing the time but changing the viewpoint, the NHR can be used to simultaneously change time and viewpoint, i.e., as the viewer changes the perspective, the perform continues his/her movement.

Since the features extracted sing FE module preserve spatio-temporal coherence over the sequence, they can be potentially used to generate an animation mesh (AM) from the point cloud sequence. An AM should maintain consistent vertices and connectivity. The mesh from the first frame can be used as a template, and extracted features can be used to establish temporal correspondences of the vertices to guide AM generation.

Figure 8:
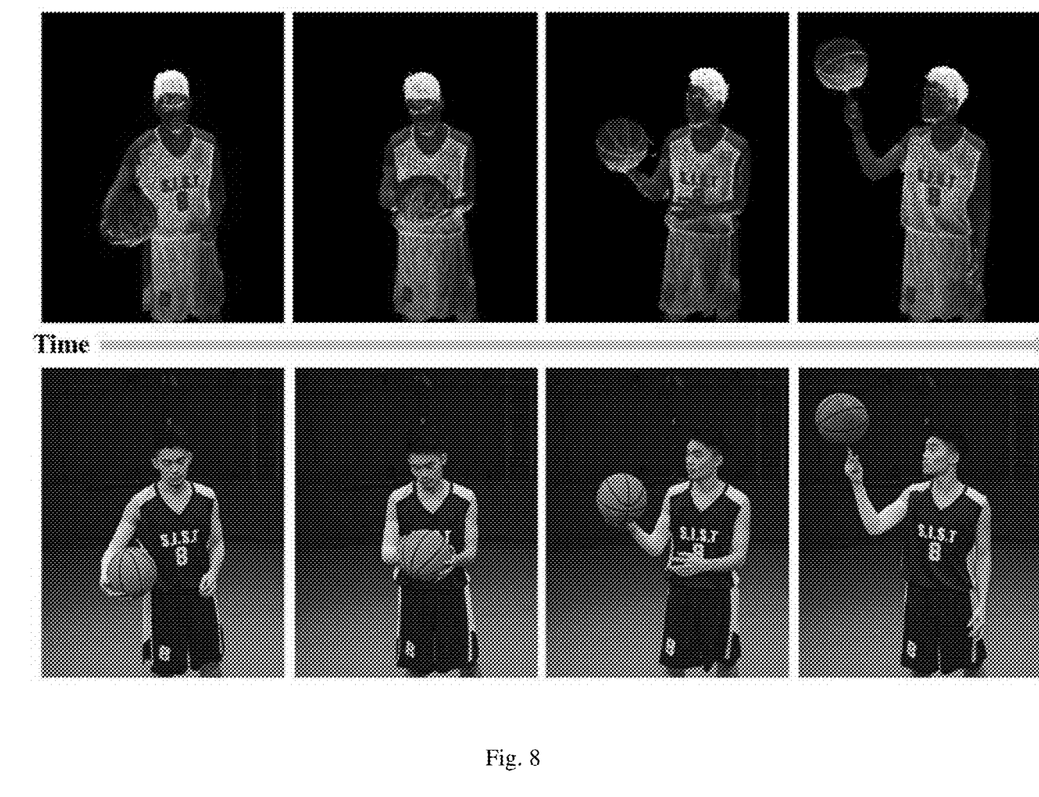
FIG. 8 is an exemplary diagram showing the FE features visualized from the point cloud sequence in color, or color coded features at different frames within the sequence in accordance with one embodiment of the present invention.

FIG. 8 is an exemplary diagram showing the FE features visualized from the point cloud sequence in color, or color coded features at different frames within the sequence in accordance with one embodiment of the present invention. These features exhibit strong semantic coherence, even though the point clouds are individually reconstructed at each frame without coherence. This implies effectiveness and potential usefulness of the FE module for correspondence matching.

7. Conclusions

In accordance with embodiment of the present invention, a novel Neural Human Renderer (NHR) is provided for high quality rendering of dynamic 3D human models captured under a multi-view dome system. While most existing neural rendering (NR) techniques focused on static scenes or objects, the NHR explicitly uses temporal correspondences to compensate for sparsity in spatial/angular sampling. By exploiting PointNet++ for feature extraction, semantic labeling for feature matching, and anti-aliased CNN for rendering, the method in accordance with embodiments of the present invention establishes and subsequently uses spatio-temporal 3D correspondences to significantly improve rendering quality even with poor 3D reconstructions. In particular, the NHR has shown superior performance on objects such as hair, hands, nose, and foot that are difficult to reconstruct correctly, even using densely sample cameras or active 3D sensors. The use of correspondences also mitigates the flickering artifacts in the existing per-frame based NR methods.

It is also demonstrated that the new views synthesized by the NHR can be used to further improve 3D reconstruction via shape-from-silhouette.

8. Quantitative Comparison

Details of scene parameters of the datasets used in this invention are listed in Table 1. A quantitative comparison with other methods was performed, including with PCR, TM, PCR-U, Image-based Rendering (IBR) and NHR with and without GR. PSNR, SSIM and MSE metrics were used to measure gaps between GT images. These results of averaged PSNR, SSIM and MSE of each scene under different approaches are listed in Table 2, Table 3 and Table 4, respectively.

TABLE 1

| scene | #cameras | #frames | #images | avg #points |
|---|---|---|---|---|
| sport1 | 56 | 200 | 11200 | 17.8w |
| sport2 | 56 | 200 | 11200 | 30.6w |
| sport3 | 56 | 200 | 11200 | 29.4w |
| basketball | 72 | 195 | 14040 | 16.5w |
| dance | 80 | 600 | 48000 | 25.6w |

TABLE 2

| | sport1 | sport2 | sport3 | dance | basketball |
|---|---|---|---|---|---|
| PCR | 17.458 | 20.002 | 19.760 | 20.664 | 19.463 |
| PCR-U | 25.104 | 25.654 | 26.006 | 22.796 | 24.130 |
| TM | 22.419 | 22.103 | 22.318 | 20.749 | 21.947 |
| IBR | 22.632 | 22.369 | 22.644 | 20.269 | 22.120 |
| NHR w/o GR | 26.951 | 26.713 | 27.218 | 22.602 | 24.660 |
| NHR w GR | 27.385 | 26.925 | 26.889 | 23.367 | 25.138 |

TABLE 3

| | sport1 | sport2 | sport3 | dance | basketball |
|---|---|---|---|---|---|
| PCR | 0.827 | 0.855 | 0.849 | 0.890 | 0.839 |
| PCR-U | 0.963 | 0.968 | 0.969 | 0.967 | 0.964 |
| TM | 0.957 | 0.954 | 0.956 | 0.957 | 0.955 |
| IBR | 0.960 | 0.958 | 0.961 | 0.961 | 0.961 |
| NHR w/o GR | 0.975 | 0.975 | 0.976 | 0.969 | 0.969 |
| NHR w GR | 0.977 | 0.979 | 0.975 | 0.973 | 0.971 |

TABLE 4

| | sport1 | sport2 | sport3 | dance | basketball |
|---|---|---|---|---|---|
| PCR | 0.0250 | 0.0133 | 0.0147 | 0.0139 | 0.0150 |
| PCR-U | 0.0034 | 0.0032 | 0.0029 | 0.0086 | 0.0040 |
| TM | 0.0067 | 0.0067 | 0.0066 | 0.0113 | 0.0067 |
| IBR | 0.0064 | 0.0063 | 0.0062 | 0.0144 | 0.0065 |
| NHR w/o GR | 0.0020 | 0.0023 | 0.0021 | 0.0087 | 0.0038 |
| NHR w GR | 0.0021 | 0.0024 | 0.0023 | 0.0074 | 0.0035 |

The invention claimed is:

1. An image-based method of modeling and rendering a three-dimensional model of an object, the method comprising:
obtaining a three-dimensional point cloud at each frame of a synchronized, multi-view video of an object, wherein the video comprises a plurality of frames;
extracting, using a feature extracting (FE) network, a feature descriptor for each point in the point cloud for the plurality of frames;
producing a two-dimensional feature map for a target camera based on the feature descriptors and parameters of the target camera, wherein the producing comprises:
rasterizing points in the point clouds into pixel squares covering a subset of pixels in the two-dimensional feature map based on the feature descriptors, and
assigning a default feature vector to each of the rest of the pixels in the two-dimensional feature map;
generating a depth map corresponding to the two-dimensional feature map; and inputting the two-dimensional feature map and the depth map into a rendering convolutional neural (RE) network to decode the feature map into an image and a foreground mask, the method further comprises:

training the FE network and the RE network based on training data captured by a multi-camera dome system, wherein the training comprises a shared training followed by an individual training, wherein:

the shared training trains on a plurality of objects to obtain a shared RE network and different FE networks for the plurality of objects, and the individual training trains on a specific object for fine tuning the corresponding FE network.

2. The method of claim 1, wherein the point cloud is not triangulated to form a mesh.

3. The method of claim 1, further comprising:

obtaining the three-dimensional point cloud at each frame of the synchronized, multi-view video of the object using a three dimension scanning sensor comprising a depth camera.

4. The method of claim 1, further comprising:

capturing the synchronized, multi-view video of the object by a plurality of cameras from a plurality of view directions; and reconstructing the three-dimensional point cloud at each frame of the video.

5. The method of claim 4, further comprising:

taking into consideration the view directions in extracting the feature descriptor without storing the feature descriptor for each frame.

6. The method of claim 1, wherein each point in the point cloud comprises color, and the method further comprises:

imposing recovered color of the points in the feature descriptor.

7. The method of claim 1, further comprising:

extracting the feature descriptor using PointNet++.

8. The method of claim 7, further comprising:

removing a classifier branch in PointNet++.

9. The method of claim 1, wherein the feature descriptor comprises a feature vector comprising at least 20 dimensions.

10. The method of claim 9, wherein the feature vector comprises 24 dimensions.

11. The method of claim 1, wherein the producing the two-dimensional feature map further comprises mapping the feature descriptor to a target view for the target camera, wherein back-propagation of gradient on the two-dimensional feature map is directly conducted on the three-dimensional point cloud.

12. The method of claim 1, further comprising:

using U-Net to decode the feature map into the image and the foreground mask.

13. The method of claim 12, wherein the rendering convolutional neural network comprises U-Net to produce the image and the foreground mask.

14. The method of claim 13, further comprising:

replacing a downsampling operation in U-Net with Max-BlurPool and ConvBlurPool.

15. The method of claim 13, further comprising:

replacing a convolutional layer in U-Net with a gated convolution layer.

16. The method of claim 13, further comprising:

maintaining translation invariance for the feature map.

17. The method of claim 1, wherein the rendering convolutional neural network comprises an anti-aliased neural network, and the method further comprises:

training the anti-aliased convolutional neural network using a ground truth foreground mask.

18. The method of claim 17, further comprising:

performing two-dimensional image transformation to the training data.

19. The method of claim 1, further comprising:

generating a plurality of masks from a plurality of viewpoints; and using the masks as silhouettes to conduct visual hull reconstruction of a mesh.

20. The method of claim 19, further comprising:

partitioning a space of interest into a plurality of discrete voxels;

classifying the voxels into two categories; and computing a signed distance field to recover the mesh.

21. The method of claim 1, wherein the object is a performer.

* * * * *